Patented Mar. 17, 1931

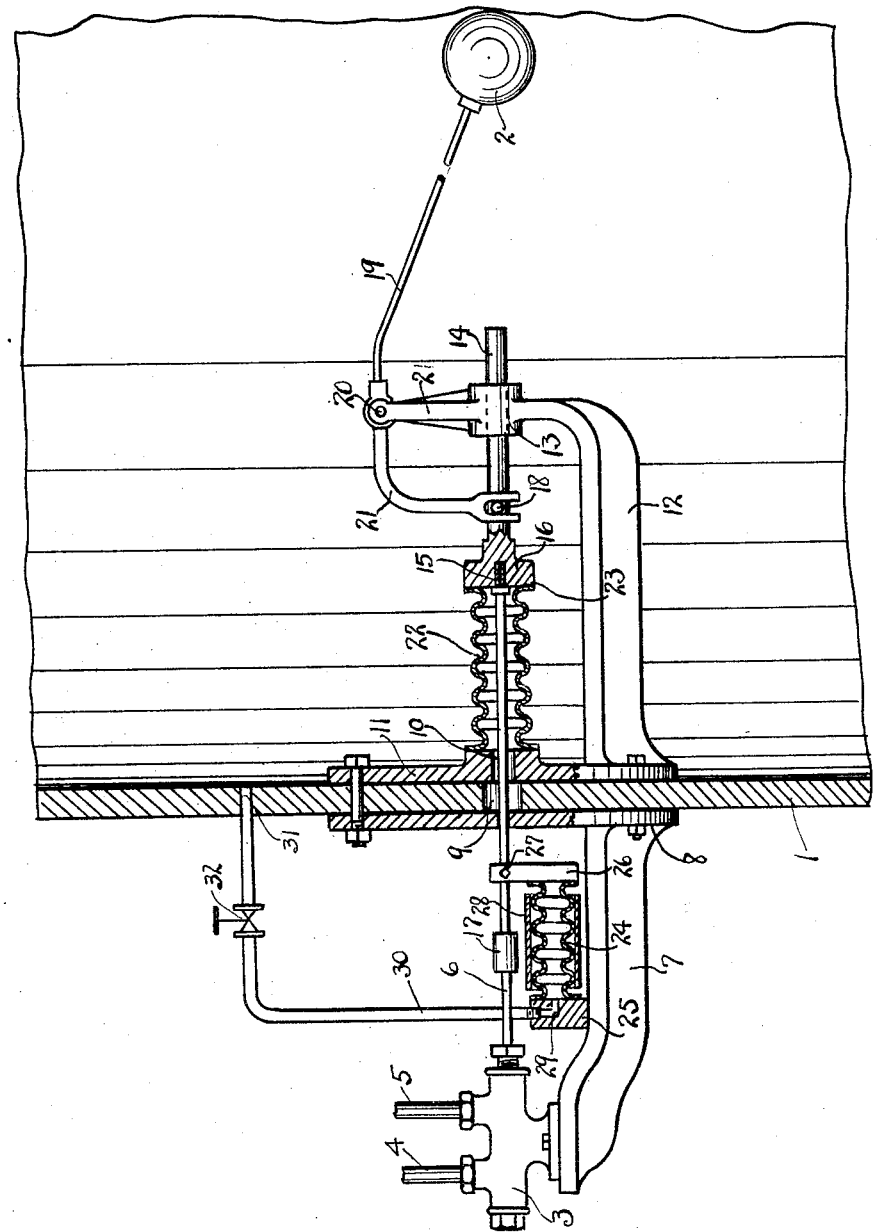

1,796,537

UNITED STATES PATENT OFFICE

JAY A. ROSSITER, OF HOUSTON, TEXAS

FLUID SEAL FOR RODS

Application filed December 27, 1927. Serial No. 242,538.

My invention relates to means for sealing the space about a moving rod, or the like, and pertains particularly to devices of this nature for use where a seal is to be maintained about a rod under variations of pressure.

In containers where liquid is maintained at a certain desired level in the container under pressure greater or less than atmospheric pressure, it is often desirable to maintain the level of liquid approximately within the desired limits by automatic means, such as a float, but where the differences of the pressure within the container and that without the container are excessive, it is difficult to actuate a control device through the walls of the container without danger of leakage about the controlling device.

In the distillation of petroleum and the like where the level of liquid within the container is maintained within certain limits, the automatic control of the feeding of liquid to the container must be effected through a control device actuated through a float in the container. The actuating rod passing through the wall of the container must be operated with a fluid-tight seal about the rod. Stuffing boxes of ordinary type have so far been unsatisfactory.

It is an object of my invention to provide a seal about the control rod under the influence of the float which will preserve an effective fluid-tight seal between the rod and the walls of the container without in any manner interfering with the easy operation of the rod.

It is contemplated that a flexible diaphragm may be employed, secured about the rod and to the walls of the container, which will not interfere with the movement of the rod, but will preserve a seal about the rod at all times.

In the drawing herewith, I have shown a device constructed in accordance with my invention, shown as mounted upon a section of the wall of the still or other container, certain parts of the invention being in vertical section for greater clearness.

In the drawing the container is to be understood as being a steel vat or tank such as may be employed in distillation of petroleum, although any other similar types of container may be employed. The liquid within the container may be distilled under high fluid pressure, or in some methods of distillation, a vacuum is maintained as far as can be effectively accomplished, so that the particular method employed in distillation may be carried out. My device is adapted for use either with a vacuum or partial vacuum within the container, or under the reverse of this situation where high fluid pressures are maintained within the container. The fluid level is maintained at any desired height and, at the proper position within the tank, a float, indicated at 2, within the tank 1, is employed to rest upon the surface of the liquid and to be moved with the variations in the height of the liquid. This float is employed to actuate a pilot valve, indicated at 3, outside the tank.

This pilot valve 3 may be of any desired construction having pipes 4 and 5 connected therewith which are understood as leading to the valve controlling the inlet of liquid to the tank. The direction of a flow of liquid through the pipes 4 and 5 to the control valve are determined by the position of the pilot valve to which a rod 6 is secured. The pilot valve is mounted upon a bracket 7 secured to a plate 8 which is bolted or otherwise secured to the wall of the container adjacent the rod 6.

The valve rod 6 is extended through an opening 9 in the wall of the container and through an opening 10 in a plate 11 on the inner wall of the container. The plate 11 is formed with a bracket 12 similar to the bracket 7 but extending inwardly into the container and serving to support a stationary sleeve 13, furnishing a bearing for a rod 14 to which the valve rod is connected.

The rod 14 is connected with the rod 6 at 15, the rod 14 being enlarged to form a head 16 with an axial socket therein into which the rod 6 is threaded. The rod 6 may have a coupling 17 therein for purposes of convenience in mounting the device upon the container.

The rod 14 has laterally extending pins 18 thereon adjacent the head 16. The rod 19 to which the float 2 is connected is pivoted at 20 upon a post 21 supported upon the bearing sleeve 13. The forward end of the arm 19 is enlarged somewhat at 21 and curved downwardly and forked at its end to straddle the pins 18 upon the rod 14. It will be noted from the drawing that the movement of the float 2 in a vertical direction will act to move the rod 14 and the rod 6 connected therewith in a horizontal direction to actuate the pilot valve 3.

The seal about the opening 10 through the plate 11 within the container is maintained by means of a flexible diaphragm 22. This diaphragm is preferably of a resilient metal. It is formed in bellows shape, being cylindrical in general outline. The end of the bellows element adjacent the wall of the container is secured to the plate 11 by welding or other similar means, so that an integral connection is made between the plate and the wall of the diaphragm. The opposite end of the bellows element is secured in a similar manner by welding to the flattened outer face of the head 16, as shown at 23. It will thus be obvious that the flexible diaphragm will allow movement of the rod in a horizontal direction without interference.

When high pressures are maintained within the vat or container, there will be a tendency to force the valve rod outwardly, due to the preponderance of pressure on the inner end of the rod around the head 16. To overcome this preponderance of pressure on the inner side of the container, I provide a similar bellows element 24 on the outside of the tank and supported upon a plate 25 upon the bracket 7. This bellows element is secured to the plate 25 by welding so as to maintain a fluid-tight fit therewith at one end and the other end is similarly secured to a plate 26 attached at 27 to the rod 6. The bellows element may be surrounded by a sleeve or housing 28 to protect the same in operation. The end of the bellows element 24 at the plate 25 is connected with a passage 29 inside the plate, leading to a pipe 30 which is directed upwardly and then extended laterally through the wall of the container 1 at 31. A valve 32 may be placed within the pipe 30 to control the passage of pressure liquid therethrough. By regulating the areas against which the pressure fluid is directed in both directions upon the valve rod 6, it will be obvious that the pressures may be maintained the same in opposite directions, so that there will be a balanced normal fluid pressure upon the said rod, and no movement of the rod will take place except in response to the movement of the float lever 19.

It is to be understood that the plates 8 and 11 on the outer and inner sides of the container are made fluid-tight relative to the container walls by means of gaskets or otherwise, and that no leakage can take place except what fluid may pass through the opening 10 in the plate 11. The seal which is maintained by the bellows element about this opening will entirely prevent the passage of pressure fluid therethrough. The action will be the same either under a vacuum or under high fluid pressures within the container. The valve rod 6 will be entirely under the control of the float lever and the pilot valve 3 will be operated to control the entrance of liquid to the container without danger of leakage about the rod.

The advantages of this construction will be obvious to those skilled in the art.

What I claim as new is:

1. In a device of the character described including a container for liquids, the interior of said container being adapted to be maintained at a pressure either higher or lower than the outside thereof, a pilot valve outside said container, a valve rod extending from said valve through the wall of said container, a float-operated lever within said container operatively connected with said rod, and an expansible diaphragm within said container connected with said rod at one end and with the wall of said container about said rod at the other to form a flexible seal between said rod and said wall.

2. In combination with a container adapted to have different fluid pressures on the interior from those on the exterior thereof, a pilot valve on the exterior of said container, a valve rod extending from said valve through the wall of said container, a float lever in said container, controlling the movement of said rod, and a flexible diaphragm about said rod secured to said rod at one end and to the inner wall of said container at the other end to form a fluid-tight closure about said rod.

3. In combination with a container adapted to have different fluid pressures on the interior from those on the exterior thereof, of a pilot valve on the exterior of said container, a valve rod extending from said valve through the wall of said container, a float lever in said container, controlling the movement of said rod, and a flexible diaphragm about said rod secured to said rod at one end and to the wall of said container at the other end to form a fluid-tight closure about said rod, and means to balance the fluid pressure tending to move said rod.

4. In combination with a container adapted to have different fluid pressures on the interior from those on the exterior thereof, a pilot valve on the exterior of said container, a valve rod extending from said valve through the wall of said container, a float lever in said container controlling the movement of said rod, and a bellows shaped diaphragm of flexible metal about said rod within said container and sealed about said rod at one end and to said wall at the other end.

5. In a device of the character described, a container, a pilot valve outside said container, a rod for said valve slidable through an opening in said container, a float controlled lever in said container operatively connected with said rod within the container, a bellows element surrounding said rod and sealed thereto at one end and to said container about said rod at its other end, whereby a flexible seal about said rod and within the container is provided.

6. In a device of the character described, a container, a pilot valve outside said container, a rod for said valve slidable through an opening in said container, a float controlled lever in said container operatively connected with said rod, a bellows element surrounding said rod and sealed thereto at one end and to said container about said rod at its other end, whereby a flexible seal between said rod and the wall of said container is provided, and means connected with the interior of said container to balance the fluid pressure in both directions longitudinally of said rod.

7. In a device of the character described, a container, a pilot valve outside said container, a rod for said valve slidable through an opening in said container, a float controlled lever in said container operatively connected with said rod, a bellows element surrounding said rod and sealed thereto at one end and to said container about said rod at its other end, whereby a flexible seal between said rod and the wall of said container is provided, and a second bellows element outside said container, secured to said rod and connected with the interior of said container to equalize the fluid pressure in both directions on said rod.

8. In a device of the character described, a container, a fluid flow control device outside said container, a rod connected with said control device and extending through an opening in said container, means within the container and responsive to the liquid level therein to move said rod, and a flexible metallic diaphragm within the container welded to said rod at one end and about said opening at its other end to provide a fluid seal about said rod.

9. In a device of the character described, a container, a fluid flow control device outside said container, an operating rod connected with said control device and extending through an opening in said container, means within the container and responsive to the liquid level therein to move said rod, and a flexible metallic diaphragm welded to said rod at one end and about said opening at its other end to provide a fluid seal about said rod, a similar flexible diaphragm connected with said rod outside said container, and means connecting said last named diaphragm with the interior of said container, whereby the pressure in opposite directions upon said rod are equalized.

In testimony whereof I hereunto affix my signature this 14th day of December, A. D. 1927.

JAY A. ROSSITER.